(12) United States Patent
Joyce et al.

(10) Patent No.: US 8,635,447 B1
(45) Date of Patent: Jan. 21, 2014

(54) MANAGING CERTIFICATES BETWEEN SOFTWARE ENVIRONMENTS

(75) Inventors: Scott E. Joyce, Foxborough, MA (US);
Christopher S. Lacasse, North Grafton, MA (US); Munish T. Desai, Shrewsbury, MA (US); Gev F. Daruwalla, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 264 days.

(21) Appl. No.: 12/978,055

(22) Filed: Dec. 23, 2010

(51) Int. Cl.
*H04L 29/06* (2006.01)

(52) U.S. Cl.
USPC ............... 713/156; 713/164; 726/5; 726/18

(58) Field of Classification Search
None
See application file for complete search history.

(56) References Cited

U.S. PATENT DOCUMENTS

| | | | |
|---|---|---|---|
| 5,913,024 A * | 6/1999 | Green et al. | 726/3 |
| 7,546,454 B2 * | 6/2009 | Novack et al. | 713/156 |
| 2005/0278534 A1 * | 12/2005 | Nadalin et al. | 713/175 |
| 2006/0015716 A1 * | 1/2006 | Thornton et al. | 713/155 |
| 2009/0037388 A1 * | 2/2009 | Cooper et al. | 707/3 |
| 2010/0125855 A1 * | 5/2010 | Ferwerda et al. | 719/317 |

OTHER PUBLICATIONS

E. Jonsson. "Rich Internet Applications for the Enterprise." Dec. 2007.*
R. Talviste. "An improved method for privacy-preserving web-based data collection." Apr. 2009.*

* cited by examiner

*Primary Examiner* — Benjamin Lanier
(74) *Attorney, Agent, or Firm* — Krishnendu Gupta; Jason A. Reyes (57) ABSTRACT

A method is used in managing certificates between software environments. In a Flex operating environment, a certificate store is maintained that is accessible to a Java operating environment. In the Flex operating environment, certificates from the Flex and Java operating environments are caused to be validated and stored in the certificate store.

16 Claims, 6 Drawing Sheets

Certificate Management

◯ A systems's certificate must be accepted before it can be managed.
You can accept a certificate by selecting one or more entries and clicking accept.

Certificate Acceptance

| System | Certificate Acceptance |
|---|---|
| 10.14.85.95 | Accepted For Session |
| 10.14.85.94 | Accepted For Session |

1 Selected                                                                 2 items

| Accept for Session | Accept Always | Unaccept | Details |

| Close | Help |

MANAGING CERTIFICATES BETWEEN SOFTWARE ENVIRONMENTS

BACKGROUND

1. Field of the Invention

The present invention relates to managing certificates between software environments.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, Flash, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.).

With respect to networks, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object oriented programming language and a platform on which to run the Java applications (known as Java Runtime Environment or JRE). Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as a applet, it may first be sent over the network to the client machine.)

Java's objected oriented programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected oriented programming language objects communicate with each other by passing messages. Further object oriented concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Adobe Flex is a collection of technologies released by Adobe Systems for the development and deployment of cross platform rich Internet applications based on the Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. A Flex software development kit ("SDK") comes with a set of user interface components including buttons, list boxes, trees, data grids, several text controls, charts, graphs and various layout containers. Other features such as web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

It is possible for a Flex application to be launched from one domain and then connect back to a different domain by installing a cross domain policy file in a site.

The uses for the Internet and the World Wide Web are continually increasing, and have expanded into "secure" areas. Different mechanisms for maintaining security in a network such as the Internet have been developed, such as the Secure Sockets Layer (SSL) security protocol. The SSL protocol uses a public key infrastructure to maintain security. In establishing an SSL connection between a client computer and a server computer hosting a web page, the server computer transmits a certificate to the client computer for verification or validation.

A client/server network system and environment typically includes multiple network server computers, and multiple network client computers. The computers communicate with each other over a data communications network which may comprise a public network such as the Internet and/or local-area networks and private wide-area networks.

Each network server computer hosts content (e.g., Java or Flex applications and/or one or more World Wide Web pages) that can be accessed by a web browser or other application executing at a client computer. The web browser can establish a secure connection with one of the server computers using a secure communications protocol such as SSL.

Each client computer maintains a certificate store that includes one or more trusted certificates. The store can be implemented, for example, as part of the web browser or part of an operating system or some other application executing on the client. To establish a secure connection between a client computer and a server computer, the server computer transmits a server certificate to the client computer. The client computer uses the server certificate to verify or validate that server computer can be trusted.

The store is part of a software application (e.g., the web browser or an operating system). Certificates can be automatically added to the store after the application has been deployed and installed on client computers.

Each certificate may optionally include one or more usage parameters. These usage parameters are used to limit the manner in which the certificate can be used. For example, a particular certificate may have its usage limited to only certain applications. Thus, it may not be possible to use that particular certificate for establishing a secure connection to a server computer. In an example, the usage parameters are denoted by properties, policy extensions, and/or an enhance key usage (EKU) extension that are part of, or alternatively associated with, the certificate.

The SSL protocol (sometimes called the Transport Level Security (TLS) protocol) is an industry standard method by which secure data connections or sessions can be established. The SSL protocol provides data encryption, server authentication, message integrity and optional client authentication over computer networks. SSL is a so-called transport layer protocol since it is defined to operate on the "sockets" level of a computer network. It will be understood by those skilled in the art that "sockets" is the standard application program interface (API) by which data is transferred on the transport level of a computer network. As a result of SSL operating on the sockets level of a network, there must be an end-to-end direct connection between networked devices in order for SSL to function correctly.

Java offers storage for public and private keys, and their associated certificates or certificate chains in a database known as a Keystore. The default Keystore implementation in Java is a flat file in a proprietary form known as a Java Keystore, or JKS.

Typically in practice, when a user's Web browser first tries to contact a server for a secure transaction, the server sends its digital certificate to the browser. This certificate includes (among other things) the server's public key, the server's identity, the name of the certificate authority (CA) that signed the certificate and the signature itself (which is a mathematical hash of the certificate encrypted with the CA's private key). To validate the certificate, the browser computes the certificate hash and compares the result with the hash obtained by decrypting the signature using the CA's public key (as well as checking the validity dates and identity included in the certificate against the desired server). To then validate the server, the browser encrypts a message with the public key obtained from the certificate and sends it to the server. If the server can prove it can decrypt that message then it must have the associated private key and the authentication has succeeded. If desired, the server may likewise validate the browser. Once the browser and (optionally) the server is/are satisfied that each is the computer it claims to be, the browser and server can exchange session keys (additional keys that are used to encrypt the data transfers between the computers from then on).

Warning messages are generated by browsers in response to unexpected events during SSL communications. For example, a browser may generate a warning page when it receives an indication that a computer other than the server the browser was attempting to contact has replied. In particular examples, a warning page can provide a warning to the user that the digital certificate received by the browser was issued by an entity that the browser does not recognize (or that the browser has not been configured to trust), and/or a warning that the certificate does not comply with the name of the server the browser was attempting to contact. The user can click on an "OK" or "YES" button to have the transaction proceed. It may be possible to include further information in the certificate which is viewable if the user selects a "View Certificate" button on the warning page.

SUMMARY OF THE INVENTION

A method is used in managing certificates between software environments. In a Flex operating environment, a certificate store is maintained that is accessible to a Java operating environment. In the Flex operating environment, certificates from the Flex and Java operating environments are caused to be validated and stored in the certificate store.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in managing certificates between software environments. In at least one implementation, the technique may be used to help provide for Flex and Java certificate validation. At least one implementation using the technique supports separate SSL communication stacks to the same source with a single validation point and user validation. In such an implementation, by validating and accepting the SSL certificates in a central location the user does not need to be aware of the separate stacks.

Figure 1:
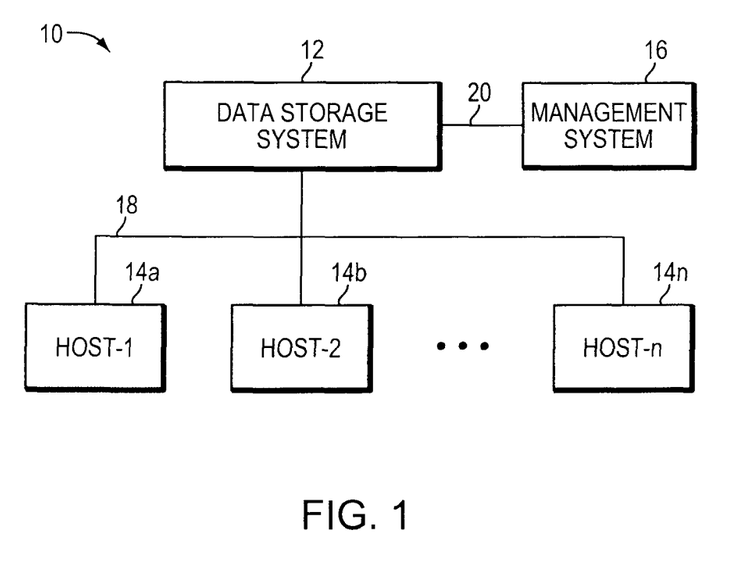
FIGS. 1, 3 are illustrations of systems that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
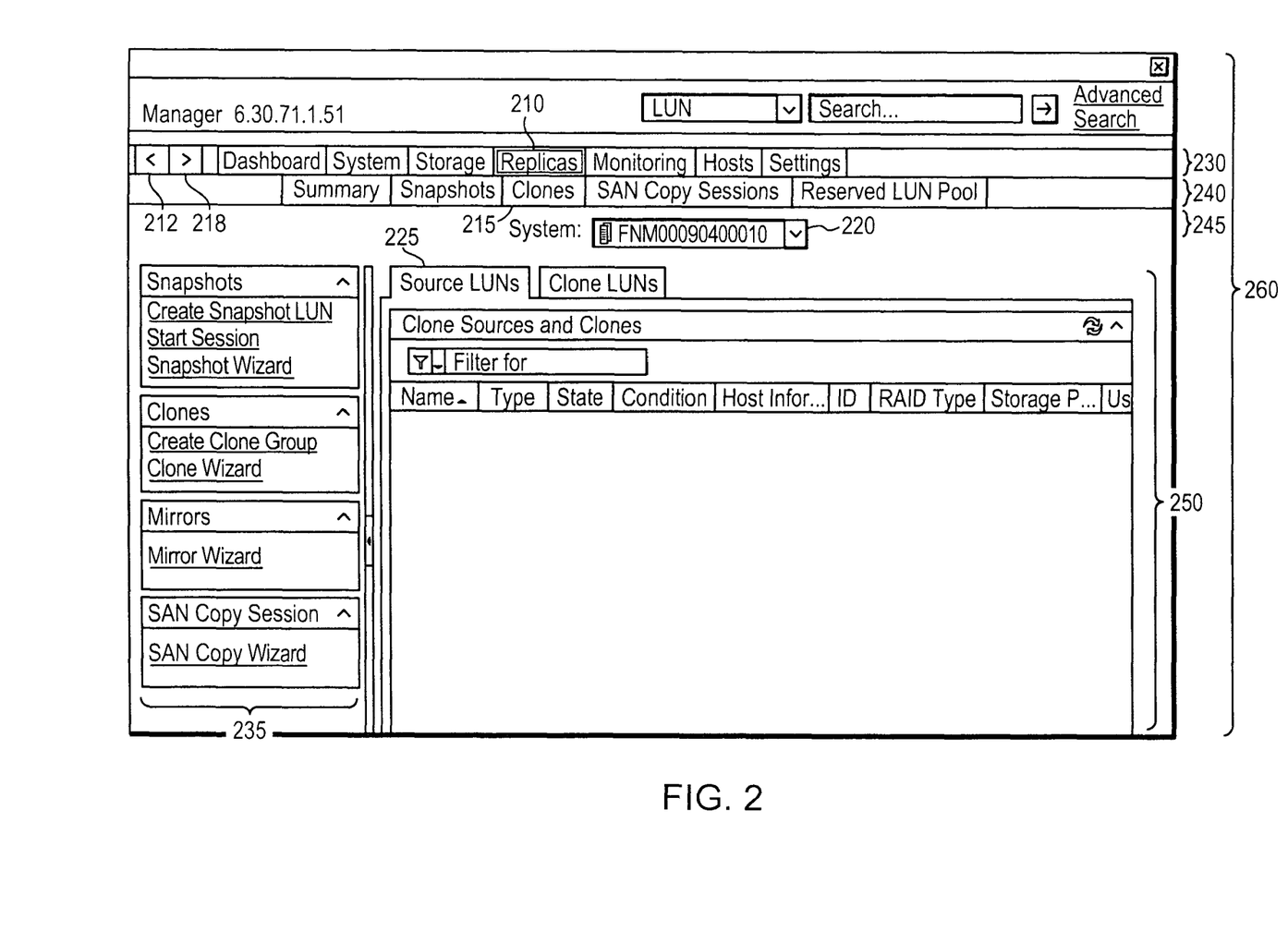
FIGS. 2, 4-6 are an illustrations of user interface screens and content that may be used with the technique herein.

Referring now to FIG. 2, shown is an example of a GUI 260 that may be used in connection with the technique described herein and that may be included in the management system 16. As shown, GUI 260 has a section panel 230 that has buttons including REPLICAS button 210 and a backward navigation button 212 and a forward navigation button 218. GUI 260 also has s subsection panel 240 that has buttons including CLONES button 215. A system selection area 245 of GUI 260 has a system selection pulldown menu 220. GUI 260 also has a links table 235 and main body area 250 that has tabs including tab 225.

Figure 3:
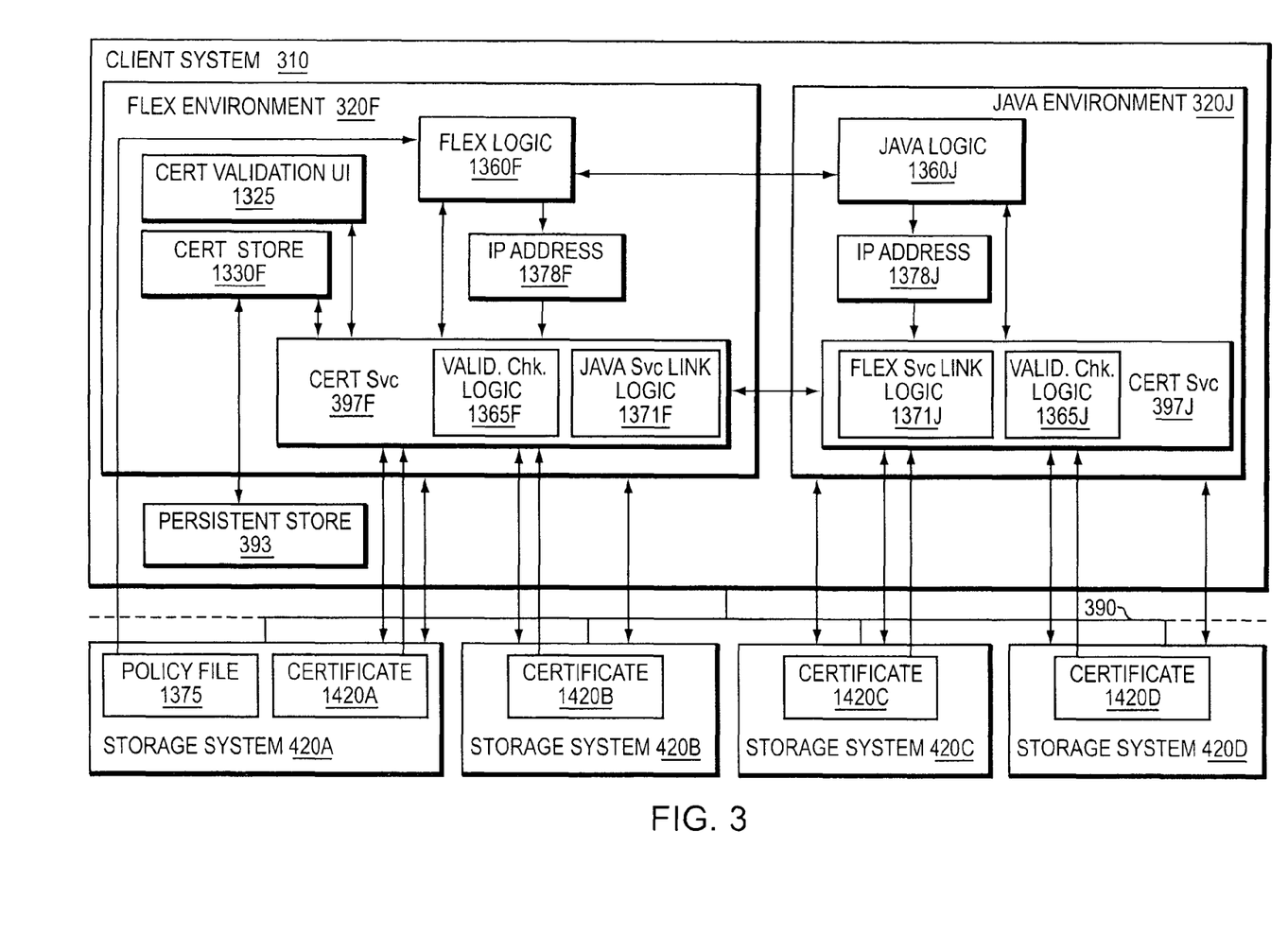

FIG. 3 illustrates details of an implementation example that uses the technique, and that may be used in producing and/or controlling GUI 260. Client system 310 (e.g., a computer running a Web browser) may be, include, or be included in management system 16, and may be used in producing GUI 260, one or more of storage systems 420A, 420B, 420C, 420D may be, include, or be included in data storage systems 12, and network 390 may be, include, or be included in communication medium 20.

System 310 has Flex operating environment 320F and Java operating environment 320J, which includes the JRE.

Java logic 1360J, Flex service link logic 1371J, validation checking logic 1365J, certificate service 397J, Flex logic 1360F, certificate validation user interface (UI) 1325, certificate store 1330F, Java service link logic 1371F, validation checking logic 1365F, and certificate service 397F are elements that are not included in environments 320F, 320J respectively but that execute and/or are used on environments 320F, 320J as described below.

Flex environment 320F and elements used on environment 320F are used directly to manage certificates and store 1330F and to produce UI 1325. Java environment 320J and elements used on environment 320J are used to support management of certificates and store 1330F and production of UI 1325.

On startup, system 310 loads Flex environment 320F and elements used on environment 320F for use in communicating with, e.g., storage systems 420A, 420B. For example, if the user uses system selection pulldown menu 220 to select system 420A, system 310 may rely on Flex environment 320F and elements used on environment 320F to communicate with system 420A to retrieve status and/or configuration information about system 420A to help fill out main body area 250 for system 420A.

Similarly, if necessary, on startup, system 310 loads Java environment 320J and elements used on environment 320J for use in communicating with, e.g., storage systems 420C, 420D. For example, if the user uses system selection pulldown menu 220 to select system 420C, system 310 may rely on Java environment 320J and elements used on environment 320J to communicate with system 420C to retrieve status and/or configuration information about system 420C to help fill out main body area 250 for system 420C.

System 310 uses certificates to help communicate securely with storage systems 420A, 420B, 420C, 420D. Flex environment 320F and elements used on environment 320F may not be able to communicate directly or sufficiently with systems 420C, 420D. In such a case, system 310 must rely on Java environment 320J and elements used on environment 320J to communicate with systems 420C, 420D (which are therefore "Java-access systems"). In at least some implementations, any communication that Flex environment 320F and elements used on environment 320F require with Java-access systems must be routed through Java environment 320J, so that, for example, Java environment 320J retrieves information from system 420C and provides such information to Flex environment 320F so that elements used on environment 320F can help fill out main body area 250 for system 420C.

In an example, an existing implementation has many Java based resources available to be leveraged by Flex environment 320F and elements used on environment 320F. In general, such resources are from or are derived from an existing Java-based user interface system, and help Flex environment 320F and elements used on environment 320F to communicate with Java-access systems to produce GUI 260.

In at least some cases, environment 320F makes use of such Java based resources by using Flex logic 1360F to make a request to Java logic 1360J. For example, environment 320F may display in GUI 260 a page about LUNs or disks, and the user may click on a button on such page. In such a case, the request includes an RPC made to Java logic 1360J.

System 310 manages certificates in a central location, i.e., store 1330F, for use by both environments 320F, 320J. Service 397F causes certificates to be retrieved from storage systems and validated if possible, causes validated certificates to be stored in store 1330F, and when system 310 needs to communicate with a storage system, e.g., system 420C, checks store 1330F to determine whether such system's certificate has already been validated.

When system 310 is initially discovering storage systems to manage, logic 1360F has an initial IP address (e.g., address 1378F) of a storage system, e.g., system 420A, which IP address may, for example, be provided by the user or in the context in which system 310 was loaded or launched, e.g., from system 420A. To facilitate SSL communications with the storage system, the IP address is provided to service 397F for certificate handling. Such handling includes using the IP address to contact such storage system, retrieving a certificate, e.g., certificate 1420A, from such storage system, using logic 1365F to determine whether the certificate is already noted in store 1330F as a validated certificate, and if not, using UI 1325 to prompt the user to review and validate the certificate and then storing such validated certificated in store 1330F. In at least some cases, the user is not so prompted until multiple certificates are gathered and can be presented all at once to the user.

To retrieve the certificate from the storage system represented by the IP address, service 397F may be able to communicate directly with the storage system (e.g., if the storage system is the context in which system 310 was loaded), or may need to involve other processes to communicate with such storage system. System 420A may have a policy file 1375 (referred to as a Flex cross domain policy file) that logic 1360F can access that indicates IP addresses of other storage systems (e.g., system 420B) that can be accessed by environment 320F, and based on such file logic 1360F can cause service 397F to retrieve certificates from such other storage systems.

In the case of Java-access systems such as systems 420C, 420D, service 397F uses logic 1371F, 1371J to connect with service 397J which can access such storage systems to retrieve their respective certificates 1420C, 1420D, and return them to service 397F.

In at least some cases, both services 397F, 397J may be directed to attempt to retrieve a certificate from the same storage system, and the first of services 397F, 397J to successfully retrieve the certificate submits it for use in validation and serves as a path for checking validation of the certificate subsequently.

In SSL operation, when a network call is to be made by environment 320F to a storage system using IP address 1378F, logic 1360F invokes logic 1365F to determine whether the storage system's certificate has been validated, logic 1365F checks store 1325, and service 397F responds with the answer of "valid" or "invalid". In SSL operation, when a network call is to be made by environment 320J to a storage system using IP address 1378J, logic 1360J invokes logic 1365J to determine whether the storage system's certificate has been validated, service 397J uses logic 1371J, 1371F to invoke logic 1365F for such determination, logic 1365F checks store 1325, service 397F responds to service 397J with the answer of "valid" or "invalid", and service 397F passes such answer back to logic 1360J.

Figure 4:
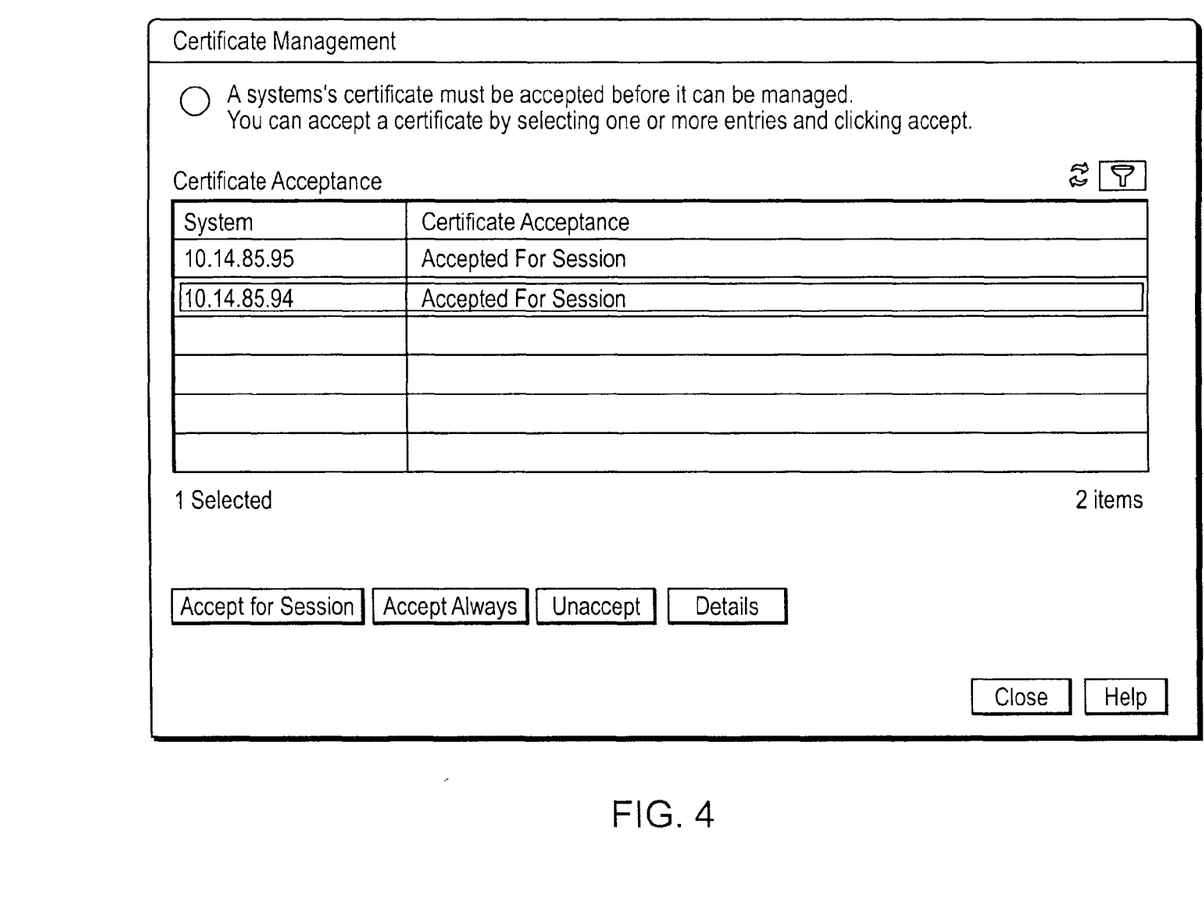

In at least one implementation, store 1330F is implemented in volatile memory and any certificates validated with the intent of being used for longer than the current session (e.g., validated by clicking "accept always" as shown in FIG. 4) are saved in persistent store 393 (e.g., file on disk) before store 1330F shuts down (e.g., when environment 320F is shutting down), and are restored to store 1330F when store 1330F is restarted.

In an example scenario, a user may need to validate certificates for many different storage systems, and system 310 facilitates this validation by the user, by collecting certificates for all of the storage systems and presenting them together for the user in UI 1325, so that the user can validate them all at once, e.g., by selecting all and clicking an "accept" or "validate" or "confirm" button.

Storing certificates for both environments 320F, 320J in a single store facilitates presenting them together for the user and also helps avoid an out of synchronization situation between the environments with respect to certificates, which can be especially important in the case of a GUI screen that relies on information accessed through both environments. Storing certificates for both environments 320F, 320J in a single store also helps avoid making the user aware that system is built upon more than one environment.

Figure 5:
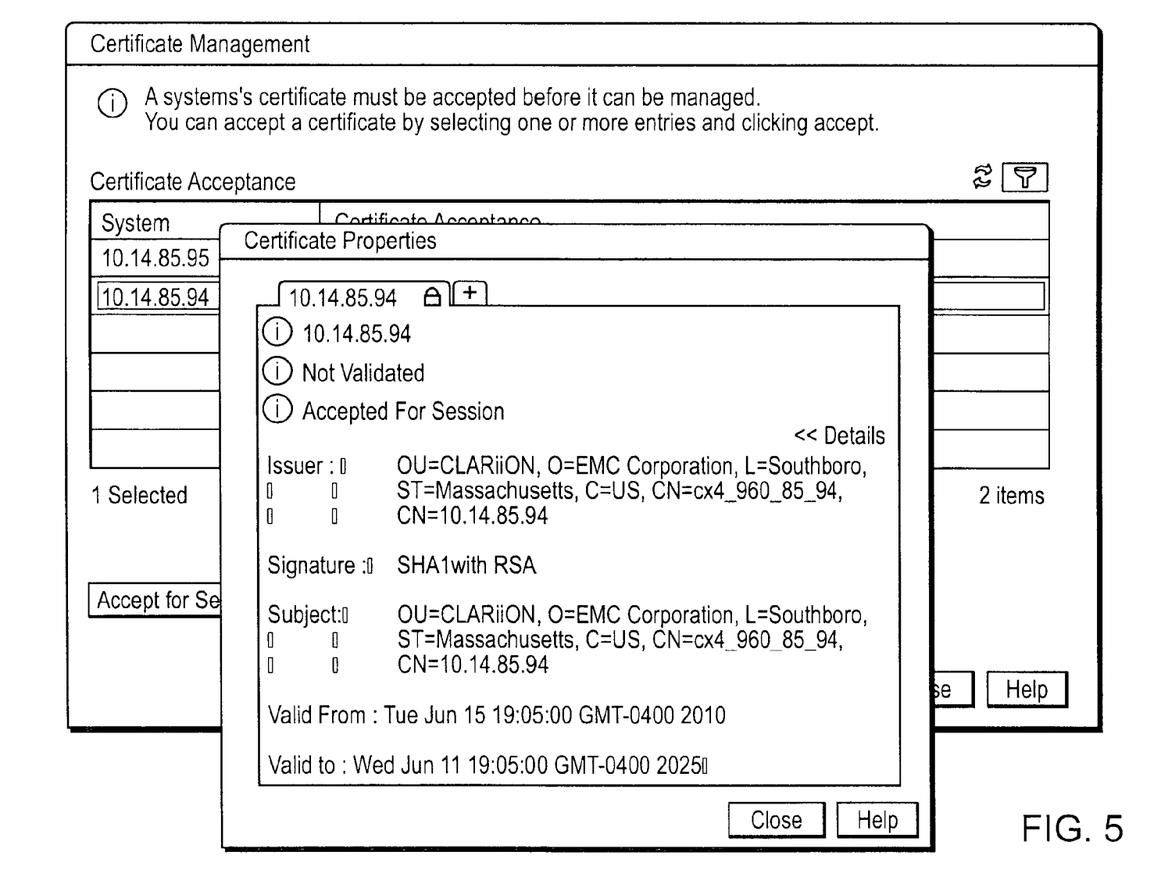
Figure 6:
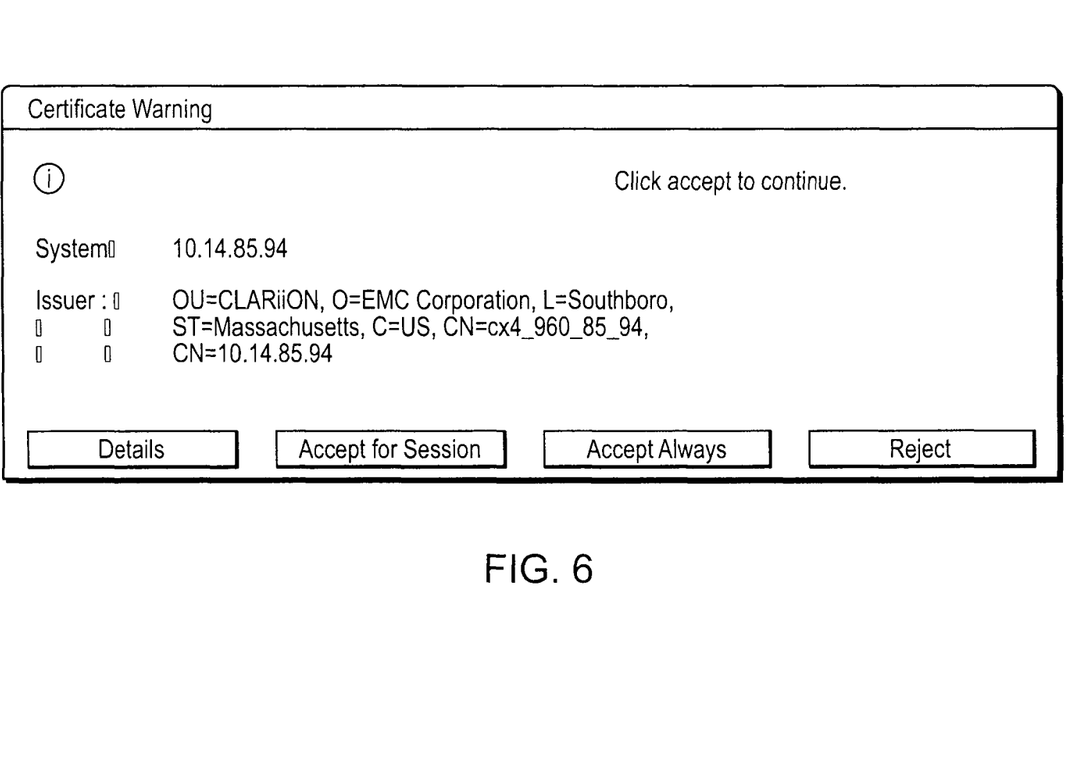

FIG. 4 illustrates an example of UI 1325 in which multiple certificates are presented to user for validation. FIG. 5 illustrates an example of certificate properties that are displayed when a "details" button is selected in the UI of FIG. 4. FIG. 6 illustrates an example of a warning in UI 1325 to the user that a certificate needs to be validated.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing certificates between software environments, the method comprising:
   maintaining, in a first operating environment, a certificate store that is accessible to a second operating environment;
   providing separate SSL communication stacks to the certificate store such that a single validation point is provided for validation;
   retrieving, by the first operating environment, a first certificate;

retrieving, by the second operating environment, a second certificate;

presenting the first certificate and the second certificate all at once to a user such that the user can validate the first certificate and the second certificate all at once; and causing, in the first operating environment, certificates retrieved by the first and second operating environments to be validated and the validated certificates to be stored in the certificate store.

2. A method of claim 1, wherein a data storage system management system uses the certificates to help communicate securely with data storage systems, and the data storage system management system relies on the second operating environment to communicate with the data storage systems.

3. A method of claim 1, wherein the certificates are retrieved from data storage systems.

4. A method of claim 1, wherein when communication with a storage system is needed, the certificate store is checked to determine whether the storage system's certificate has already been validated.

5. A method of claim 1, wherein an initial IP address is used to facilitate SSL communications using at least one of the certificates.

6. A method of claim 1, wherein multiple certificates are gathered and presented to a user and the user is prompted to validate the certificates all at once.

7. A method of claim 1, wherein the first operating environment uses the second operating environment to retrieve a certificate.

8. A method of claim 1, wherein multiple certificates are gathered and presented to the user and the user can view details of the certificates before validating the certificates.

9. A system for use in managing certificates between software environments, the system comprising:

a processor comprising a program logic for carrying out the steps of:

first logic maintaining, in a first operating environment, a certificate store that is accessible to a second operating environment;

second logic providing separate SSL communication stacks to the certificate store such that a single validation point is provided for validation;

third logic retrieving, by the first operating environment, a first certificate;

fourth logic retrieving, by the second operating environment, a second certificate;

fifth logic presenting the first certificate and the second certificate to a user such that the user can validate the first certificate and the second certificate; and sixth logic causing, in the first operating environment, certificates retrieved by the first and second operating environments to be validated and the validated certificates to be stored in the certificate store.

10. A system of claim 9, wherein a data storage system management system uses the certificates to help communicate securely with data storage systems, and the data storage system management system relies on the second operating environment to communicate with the data storage systems.

11. A system of claim 9, wherein the certificates are retrieved from data storage systems.

12. A system of claim 9, wherein when communication with a storage system is needed, the certificate store is checked to determine whether the storage system's certificate has already been validated.

13. A system of claim 9, wherein an initial IP address is used to facilitate SSL communications using at least one of the certificates.

14. A system of claim 9, wherein multiple certificates are gathered and presented to a user and the user is prompted to validate the certificates all at once.

15. A system of claim 9, wherein the first operating environment uses the second operating environment to retrieve a certificate.

16. A system of claim 9, wherein multiple certificates are gathered and presented to the user and the user can view details of the certificates before validating the certificates.

* * * * *